United States Patent [19]

Kawada et al.

[11] Patent Number: 5,179,437
[45] Date of Patent: Jan. 12, 1993

[54] APPARATUS FOR COLOR CORRECTION OF IMAGE SIGNALS OF A COLOR TELEVISION CAMERA

[75] Inventors: Norihiko Kawada; Shoichi Ioka; Masahiro Yamashita; Moriki Miyamoto; Katsumi Degawa, all of Tokyo, Japan

[73] Assignee: Ikegani Tsushinki Co., Ltd., Tokyo, Japan

[21] Appl. No.: 635,600
[22] PCT Filed: Apr. 27, 1990
[86] PCT No.: PCT/JP90/00570
  § 371 Date: Dec. 28, 1990
  § 102(e) Date: Dec. 28, 1990
[87] PCT Pub. No.: WO90/13975
  PCT Pub. Date: Nov. 15, 1990

[30] Foreign Application Priority Data

Apr. 28, 1989 [JP] Japan ................................. 1-107753

[51] Int. Cl.⁵ .................... H04N 9/64; H04N 17/02
[52] U.S. Cl. ........................................ 358/10; 382/48
[58] Field of Search .............. 358/10, 29, 27, 41, 358/139; 382/48, 61

[56] References Cited

U.S. PATENT DOCUMENTS

| | | | |
|---|---|---|---|
| 3,987,482 | 10/1976 | Robers | 358/10 |
| 4,285,004 | 8/1981 | Morrison | 358/10 |
| 4,326,219 | 4/1982 | Griesshaber | 358/139 |
| 4,414,573 | 11/1983 | Griesshaber | 358/10 |
| 4,709,260 | 11/1987 | Geerts | 358/10 |
| 5,065,351 | 11/1991 | Johnston | 358/10 |

FOREIGN PATENT DOCUMENTS

| | | |
|---|---|---|
| 57-196664 | 12/1982 | Japan . |
| 61-50384 | 4/1986 | Japan . |
| 61-103979 | 7/1986 | Japan . |
| 62-104389 | 5/1987 | Japan . |
| 62-133883 | 6/1987 | Japan . |

Primary Examiner—Tommy P. Chin
Attorney, Agent, or Firm—Nils H. Ljungman and Associates

[57] ABSTRACT

A color correction apparatus for a color television camera, in which color correction is performed while comparing two images obtained from a test chart signal generated from a test chart signal-generating circuit disposed in the interior of a camera device or outside the camera device and a pick-up signal generated by photographing a test chart by a camera device. By arranging circuits for automatizing these functions, color correction based on various data is automatically carried out, and when a special effect is produced by performing color correction of other camera device based on color correction data detected by one camera device, the same color correction can be simultaneously performed in other camera device based on the color correction data of one camera device.

4 Claims, 3 Drawing Sheets

APPARATUS FOR COLOR CORRECTION OF IMAGE SIGNALS OF A COLOR TELEVISION CAMERA

TECHNICAL FIELD

The present invention relates to an apparatus for the color correction of image signals of a color television camera.

BACKGROUND ART

As the automatic adjustment in a color television camera, there have been performed registration, white balance, adjustment of levels of respective parts of a process amplifier and optical tracking of an image pickup element. However, color correction such as hue correction or color saturation correction has not been automatically conducted.

There has been known a system in which automatic adjustment is carried out by using chromatic test charts of white, black and gray so that levels of image signals R, G and B are higher than prescribed values, but this adjustment is luminance adjustment and not color correction.

Color correction has been manually conducted. Namely, an external test chart signal generator is used, and adjustment of the color of a color television camera is carried out while comparing a test chart image by signals from this generator on a television monitor with an image obtained by photographing a test chart by a television camera.

According to this manual adjustment, however, a test chart signal generator, a signal changeover device and the like should be prepared and a monitoring operation should be carried out while carrying out changeover operations by an operator. Accordingly, the operation is troublesome and a long time is required for the operation.

In the case where a special effect is produced by using a plurality of cameras, it is very troublesome and difficult to perform the same color correction for respective cameras.

The present invention has been completed under this background, and it is a primary object of the present invention to provide a color correction apparatus for a color television camera, in which color correction can be easily carried out and the color correction operation can be automatized and in which when the color correction operation is automatized, the same color correction can be simultaneously performed for a plurality of color television cameras.

DISCLOSURE OF THE INVENTION

In accordance with the present invention, there is provided a color correction apparatus for a color television camera, which comprises a test chart signal-generating circuit disposed in the interior of a camera device or outside the camera device to generate a color test chart signal, and a signal changeover circuit for changing a test chart signal from the test chart signal-generating circuit and a signal obtained by photographing a test chart by the camera device over to each other and outputting said signals and a color correction circuit for making color correction of at least the signal obtained by photographing the test chart by the camera device, said signal changeover circuit and color correction circuit being disposed in the camera device.

In this basic structure of the present invention, color correction by the color correction circuit is performed by the changeover operation by the signal changeover circuit disposed in the camera device, while comparing a test chart signal generated from the test chart signal-generating circuit disposed in the interior of the camera device or outside the camera device with a signal obtained by photographing a test chart by the camera device.

There can also be adopted a structure in which the above-mentioned signal changeover circuit and a control circuit for automatically controlling the color correction circuit based on an external signal are disposed in the camera device.

If this structure is adopted, color correction can be performed based on various data. Furthermore, if a function of comparing a test chart signal from the test chart signal-generating circuit with a signal obtained by photographing the test chart by the camera device while controlling the signal changeover circuit and controlling the color correction circuit so that the same image can be obtained is given, for example, to the control circuit, color correction can be automatically performed.

Moreover, the above-mentioned control circuit can be constructed so that a test chart signal from the test chart signal-generating circuit is compared with a pickup signal of the test chart by the camera device while controlling the signal changeover circuit and the color correction circuit is controlled so that the same image can be obtained.

Still further, the color correction apparatus of the present invention can comprise a camera device provided with a changeover circuit for changing a circuit passing through said color correction circuit and a circuit bypassing said color collection circuit over to each other and a correction data-detecting circuit for comparing a signal outputted through the color correction circuit of the test chart signal-generating circuit with a signal outputted while bypassing the color correction circuit and detecting data of color correction made by the color correction circuit, and a correction-controlling device for performing color correction by the color correction circuit through a control circuit of other camera device based on the data detected by the correction data-detecting circuit of one camera device.

If this structure is adopted, for example, when a special effect is produced, desired color correction is first conducted by operating the color correction circuit of one camera device, and by comparing the data of this color correction with a signal outputted from the color correction circuit while performing the changeover operation in the changeover circuit, detection can be done by the correction data-detecting circuit and the detected correction data are outputted to other camera device, whereby the same color correction can be simultaneously performed through the control circuit disposed in said camera device.

EMBODIMENTS OF THE INVENTION

Embodiments of the present invention will now be described.

Figure 1:
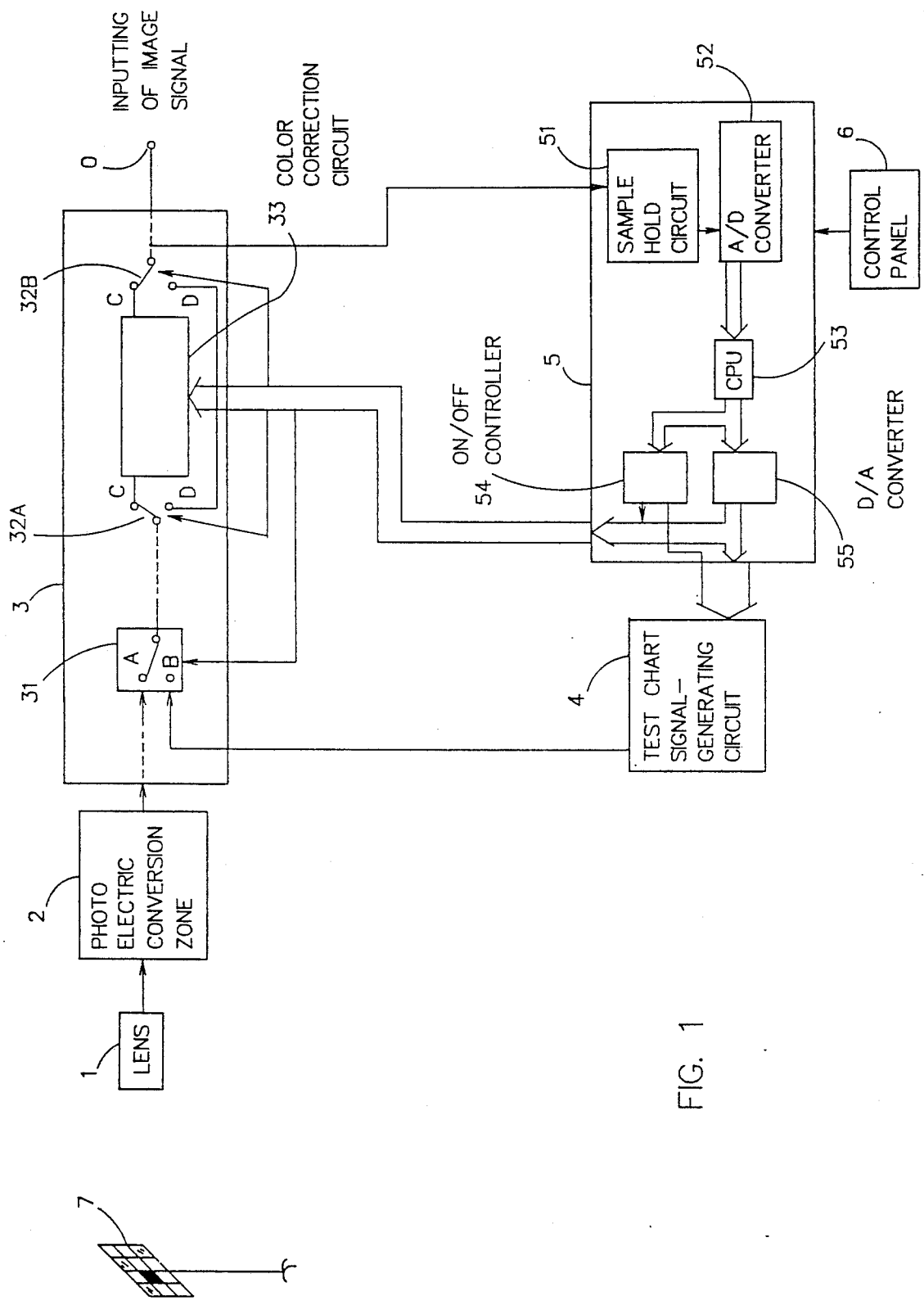
FIG. 1 is a block diagram illustrating the structure of one embodiment of the color correction apparatus for a color television camera according to the present invention.

FIG. 1 is a block diagram showing an embodiment in which color correction is automatically carried out.

Referring to FIG. 1, a light signal which has passed through a lens 1 of a color television camera is converted to an electric pick-up signal by a photo-electric conversion zone 2 comprising a pick-up element and the like, and the electric pick-up signal is inputted into an image-processing circuit 3.

A test chart signal-generating circuit 4 for generating test chart signals of various colors is disposed in a camera device. The camera device referred to herein comprises a camera proper including an optical system having the lens 1 and the like and the image-processing circuit 3, and equipments for exclusive use (for example, a control panel 6 described hereinafter). If the test chart signal-generating circuit 4 is built in the camera device, the structure becomes compact and the operation is simplified. However, the circuit 4 disposed outside the camera device can be used. Especially, in the case where color correction is automatically carried out as in the present embodiment, even if the test chart signal-generating circuit 4 disposed outside the camera device is used, the system is sufficiently advantageous only for the reason that automatic color correction can be performed.

By a signal changeover circuit 31 built in the image-processing circuit 3, a pick-up signal by the camera device and a test chart signal from the test chart signal-generating circuit 4 are changed over to each other and one signal is selectively outputted.

The output from the signal changeover circuit 31 is subjected to an image-forming signal processing by various processing circuits built in the image-processing circuit 3 and is then inputted into an input terminal of interlocking changeover switches 32A and 32B. The interlocking changeover switches 32A and 32B exert the function of carrying out a color correction processing of the input signal at one changeover position C through a color correction circuit interposed between the switches 32A and 32B and outputting the obtained signal, and outputting the signal at the other changeover position D without performing the color correction processing through a bypass circuit 34 bypassing the color correction circuit 33.

The image signal (RGB signal) from the changeover switch 32B is further processed by an encoder or the like and is then outputted as an image signal from an image signal output terminal O.

The image signal (RGB signal) is inputted into a sample hold circuit 51 of a control circuit 5. The sample hold circuit 51 holds an analog value of the image signal at a predetermined frequency, and the sample value is converted to a digital value by an AD converter 52 and the digital value is inputted in CPU 53.

CPU 53 performs the changeover operation in the signal changeover circuit 31 and interlocking changeover switches 32A and 32B and the ON/OFF control of the test chart signal-generating circuit 4 through an DA converter 54 and an ON/OFF controller 54, and also performs the analog control of the color correction circuit 33 and test chart signal-generating circuit 4 through a DA converter 55.

The control circuit 5 performs various controls by a remote control signal from a control panel 6 connected to the camera proper.

Color correction by the test charge image of the color television camera will now be described.

At first, by the signal from the control circuit 5, the signal changeover circuit 31 is set at the position A and the interlocking changeover switches 32A and 32B are set at the position C.

In this state, a color test chart 7 having divided blocks painted with different colors, respectively, is set, and the test chart 7 is photographed by the color television camera.

A pick-up signal of the test chart 7 is outputted as an image signal through the color correction circuit 33, and a predetermined area of the image signal is held by the sample hold circuit 51 and is inputted as a digital signal into CPU 53 through the AD converter 52. Then, the signal changeover circuit 31 is changed over to the position B and the interlocking changeover switches 32A and 32B are changed over to the position D, and simultaneously, the test chart signal-generating circuit 4 is started to output a test chart signal corresponding to the above-mentioned test chart 7.

The test chart signal bypasses the color correction circuit 33 and is subjected to the image-forming processing. The same predetermined area of this image signal as mentioned above is held by the sample holder circuit 51 and is inputted as a digital signal into CPU 53 through the AD converter 52.

CPU 53 compares the image signal obtained by processing the pickup signal with the image signal obtained by processing the signal from the test chart signal-generating circuit 4 and performs the analogue controls of respective potential levels for color correction by the color correction circuit 33 so that the former signal becomes in agreement with the latter signal as the reference.

By performing this control, the divergence of the pick-up signal by the dispersion and change with time of an optical lens, an optical prism (not used in some cases), the photoelectric conversion zone and other processing circuits can be automatically corrected.

When a plurality of color television cameras are connected to the color correction apparatus having this automatic correction function to produce a special effect, only by performing color correction in one camera device, the same color correction can be simultaneously performed in other camera devices.

Figure 2:
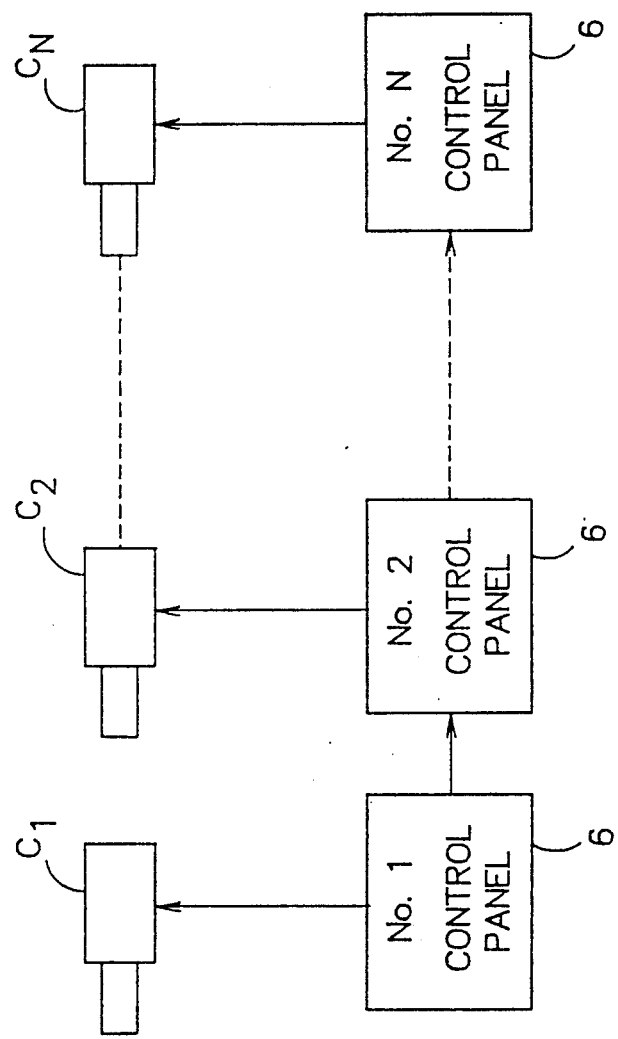
FIG. 2 is a diagram illustrating a control system in a second embodiment of the color correction apparatus for a color television camera according to the present invention, where the apparatus of the embodiment shown in FIG. 1 is utilized.

More specifically, as shown in FIG. 2, data output terminals and data input terminals of No. 1 through No. N control panels 6 connected to cameras C1 through Cn of a plurality of color television camera devices are connected to one another.

At first, the signal changeover circuit 31 of the camera proper C1 is set at the position A and the interlocking changeover switches 32A and 32B are set at the position C by the remote control signal from No. 1 control panel 6, and an object is photographed and correction to a required color is performed by the color correction circuit 33.

Then, the signal changeover circuit 31 is changed over to the position B and the test chart signal from the test chart signal-generating circuit 4 is held through the color correction circuit 33. Then, the interlocking switches 32A and 32B are changed over to the position D and the test chart signal is caused to bypass the color correction circuit 33 and is held without performing color correction.

Then, these two sample hold signals are compared with each other by CPU 53, whereby data of color correction in the correction circuit 33 are detected. Accordingly, CPU 53 constitutes the correction data-detecting circuit.

The data of color correction conducted by the camera proper C1 are outputted from the data output terminal of the control panel 6 and transferred to No. 2 through No. N control panels 6 in sequence.

Thus, No. 2 through No. N control panels 6 perform the same color correction as conducted in the camera C1 by the color correction circuit 33, through the control circuits 5 of the cameras C2 through CN connected to No. 2 through No. N control panels 6.

By adopting this structure, the same color correction can be performed substantially simultaneously in a plurality of camera devices.

In the present embodiment, the control panel 6 constitutes the correction control device.

Figure 3:
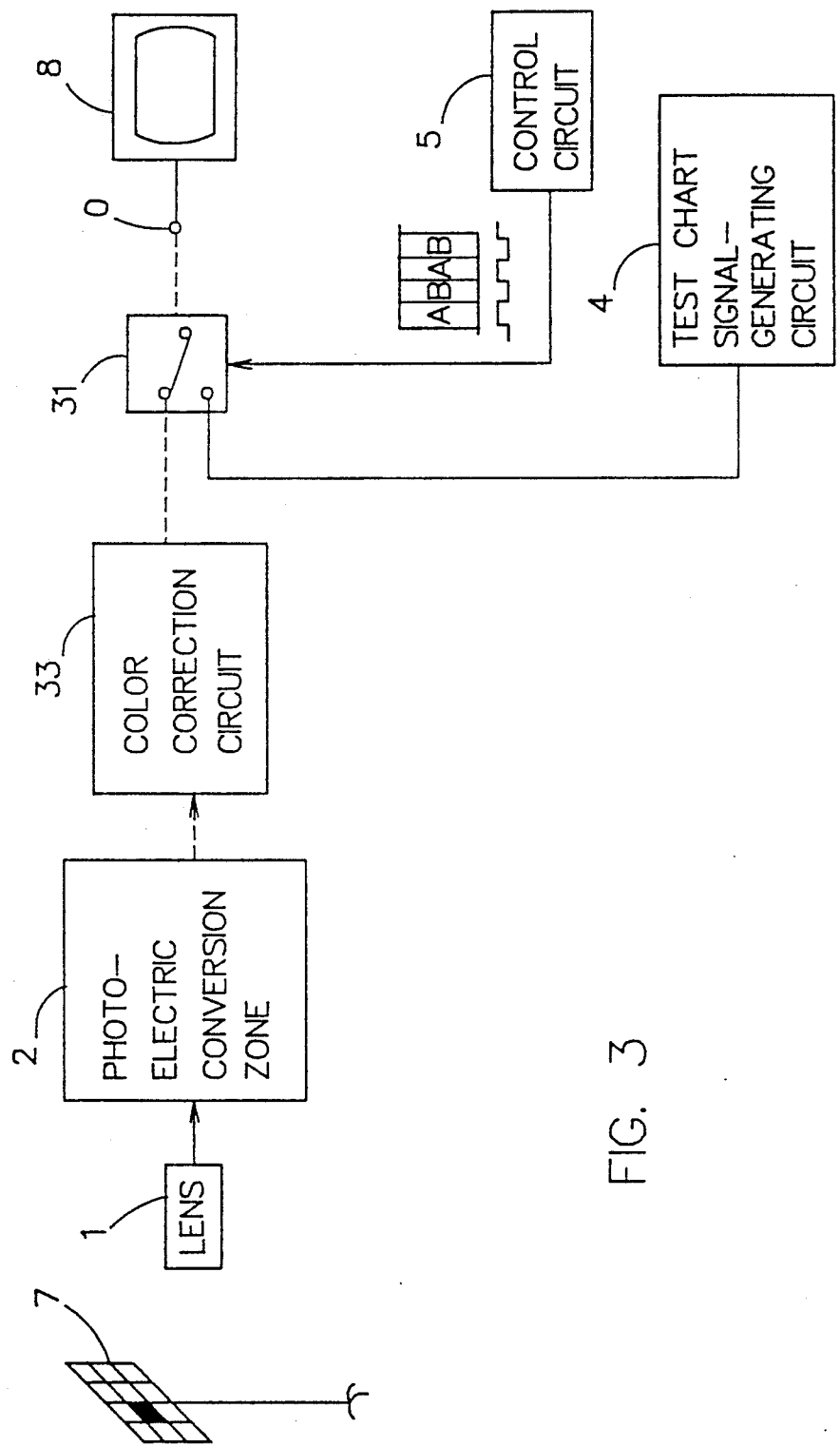
FIG. 3 is a block diagram illustrating the structure of a third embodiment of the color correction apparatus for a color television camera according to the present invention.

FIG. 3 is a block diagram illustrating an embodiment in which color correction is manually carried out in compliance with the reference color of the test chart.

Members common to the members in the embodiment of FIG. 1 where automatic correction is performed are represented by the same reference numerals as used in FIG. 1. The difference will now be described. A pick-up signal obtained by photographing the test chart by the camera device is always inputted in the color correction circuit 33. The signal changeover circuit 31 is disposed in the latter stage of the color correction circuit 33, and the pick-up signal is inputted into one input terminal A of the signal changeover circuit 31 and a test chart signal from the test chart signal-generating circuit 4 is inputted into the other input terminal B of the signal changeover circuit 31. These signals are changed over to one another and one signal is selectively outputted by the changeover of the contacts by a changeover control signal from the control circuit 5.

A television monitor 8 is connected to the image signal output terminal O, and the image obtained by photographing the test chart 7 is compared with the image by the test chart signal from the test chart signal-generating circuit 4 while seeing the monitor 8, and the color correction circuit 33 is manually operated to effect color correction.

In a specific example, the signal changeover circuit 31 is set at the position A and the image photographed by the camera is projected on the left half of the same color block of the test chart, and a changeover control signal is outputted so that the image by the test chart signal is projected on the right half. Thus, the color correction circuit 33 is manually operated so that the color of the image of the left half becomes in agreement with the color of the image of the right half as the reference.

As is seen from the foregoing description, also in case of manual correction, color correction can be easily performed by a relatively simple structure.

As is apparent from the foregoing illustration, according to the present invention by comparing an image signal by a test chart signal from a test chart signal-generating circuit disposed in the interior of a camera device or outside the camera device with an image signal obtained by photographing a test chart by a camera through a color correction circuit built in the camera device, color correction can be performed manually or automatically in compliance with the reference by the color correction circuit.

Furthermore, the color correction circuit can be automatically operated and detection is performed by the comparison of image signals obtained through this color correction circuit and obtained without passage through this color correction circuit, and by transferring the obtained correction data to control circuits of other camera devices, the same color correction can be simultaneously performed in these camera devices, with the result that the efficiency of the special effect photographing or the like can be increased.

INDUSTRIAL APPLICABILITY

As is seen from the foregoing description, the color correction apparatus for a color television camera according to the present invention is very effective for increasing the efficiency of the color correction operation including the special effect photographing of an image photographed by a color television camera in the field of the television broadcasting.

What is claimed is:

1. A color correction apparatus for at least one color television camera, which comprises:
  a first camera device, said first camera device comprising a test chart signal-generating circuit for generating a color test chart signal;
  a first signal changeover circuit for alternately switching between said color test chart signal from said test chart signal-generating circuit and a signal obtained by photographing a test chart by the camera device and outputting each of said color test chart signal and said signal obtained by photographing the test chart;
  a first color correction circuit for color-correcting at least said signal obtained by photographing the test chart;
  said first color correction circuit comprising a circuit passing therethrough for carrying one of said color test chart signal and said signal obtained by photographing the test chart through said first color correction circuit;
  a circuit bypassing said first color correction circuit for carrying said color test chart signal around said first color correction circuit;
  a first control circuit, said first control circuit comprising means for automatically controlling said first signal changeover circuit and said first color correction circuit by an external signal, said first control circuit being for comparing said color test chart signal outputted from said test chart signal-generating circuit with said signal obtained by photographing the test chart while controlling said first signal changeover circuit, and controlling said first color correction circuit so that an image obtained from said color test chart signal is essentially identical to an image obtained from said signal obtained by photographing the test chart;
  a second changeover circuit for alternately switching between said circuit passing through said first color correction circuit and said circuit bypassing said first color correction circuit;
  said first control circuit comprising a correction data-detecting circuit for comparing said signal carried through said first color correction circuit with said signal carried around said first color correction circuit and detecting data of color correction generated by said first color correction circuit; and a correction-controlling device for controlling color correction of at least one additional camera device, said at least one additional camera device comprising a second color correction circuit and a second control circuit, and said correction-controlling device being for controlling color correction of said at least one additional camera device by said second color correction circuit through said second control circuit of said at least one additional camera device based on the data detected by said correction data-detecting circuit of said first camera device.

2. A color correction apparatus for at least one color television camera, which comprises:

a first camera device, said first camera device comprising a test chart signal-generating circuit for generating a color test chart signal;

a first signal changeover circuit for alternately switching between said color test chart signal from said test chart signal-generating circuit and a signal obtained by photographing a test chart by said camera device and outputting each of said color test chart signal and said signal obtained by photographing the test chart;

a first color correction circuit for color-correcting at least said signal obtained by photographing the test chart;

a first control circuit, said first control circuit comprising means for automatically controlling said first signal changeover circuit and said first color correction circuit by an external signal;

said first color correction circuit comprising a circuit passing therethrough for carrying one of said color test chart signal and said signal obtained by photographing the test chart through said first color correction circuit;

a circuit bypassing said first color correction circuit for carrying said color test chart signal around said first color correction circuit;

a second changeover circuit for alternately switching between said circuit passing through said first color correction circuit and said circuit bypassing said first color correction circuit;

said first control circuit comprising a correction data-detecting circuit for comparing said signal carried through said first color correction circuit with said signal carried around said first color correction circuit and detecting data of color correction generated by said first color correction circuit; and a correction-controlling device for controlling color correction of at least one additional camera device, said at least one additional camera device comprising a second color correction circuit and a second control circuit, and said correction-controlling device being for controlling color correction of said at least one additional camera device by said second color correction circuit of said at least one additional camera device through said second control circuit of said at least one additional camera device based on the data detected by said first correction data-detecting circuit of said first camera device.

3. A color correction apparatus for at least one color television camera, which comprises:

a test chart signal-generating circuit for generating a color test chart signal, said test chart signal-generating circuit being disposed outside a first camera device;

a first signal changeover circuit disposed in said first camera device, said first signal changeover circuit for alternately switching between said color test chart signal from said test chart signal-generating circuit and a signal obtained by photographing a test chart by said camera device and outputting each of said color test chart signal and said signal obtained by photographing a test chart;

a first color correction circuit for color-correcting at least said signal obtained by photographing the test chart by the camera device, said color correction circuit being disposed in said first camera device;

said first color correction circuit comprising a circuit passing therethrough for carrying one of said color test chart signal and said signal obtained by photographing the test chart through said first color correction circuit;

a circuit bypassing said first color correction circuit for carrying said color test chart signal around said first color correction circuit;

a first control circuit, said first control circuit comprising means for automatically controlling said first signal changeover circuit and said color correction circuit by an external signal, said first control circuit for comparing said color test chart signal outputted from said test chart signal-generating circuit with the signal obtained by photographing said test chat while controlling said first signal changeover circuit, and controlling said color correction circuit so that an image obtained from said color test chart signal is essentially identical to an image obtained from said signal obtained by photographing the test chart;

a second changeover circuit for alternately switching between said circuit passing through said color correction circuit and said circuit bypassing said color correction circuit;

said first control circuit comprising a correction data-detecting circuit for comparing said signal carried through said first color correction circuit of said test chart signal-generating circuit with said signal carried around said first color correction circuit and detecting data of color correction generated by said first color correction circuit; and a correction-controlling device for controlling color correction of at least one additional camera device, said at least one additional camera device comprising a second color correction circuit and a second control circuit, and said correction-controlling device being for controlling color correction of said at least one additional camera device by said second color correction circuit of said at least one additional camera device through said second control circuit of said at least one additional camera device based on the data detected by said first correction data-detecting circuit of said first camera device.

4. A color correction apparatus for at least one color television camera, which comprises:

a test chart signal-generating circuit for generating a color test chart signal, said test chart signal-generating circuit being disposed outside a first camera device;

a first signal changeover circuit disposed in said first camera device, said first signal changeover circuit for alternately switching between said color test chart signal from said test chart signal-generating circuit and a signal obtained by photographing a test chart by said camera device and outputting each of said color test chart signal and said signal obtained by photographing a test chart;

a first color correction circuit for color-correcting at least said signal obtained by photographing the test chart by the camera device, said color correction circuit being disposed in said first camera device;

said first color correction circuit comprising a circuit passing therethrough for carrying one of said color test chart signal and said signal obtained by photographing the test chart through said first color correction circuit;

a circuit bypassing said first color correction circuit for carrying said color test chart signal around said first color correction circuit;

a first control circuit, said first control circuit comprising mean for automatically controlling said first signal changeover circuit and said color correction circuit by an external signal;

a second changeover circuit for alternately switching between said circuit passing through said color correction circuit and said circuit bypassing said color correction circuit;

said first control circuit comprising a correction data-detecting circuit for comparing said signal carried through said first color correction circuit of said test chart signal-generating circuit with said signal carried around said first color correction circuit and detecting data of color correction generated by said first color correction circuit; and a correction-controlling device for controlling color correction of at least one additional camera device, said at least one additional camera device comprising a second color correction circuit and a second control circuit, and said correction-controlling device being for controlling color correction of said at least one additional camera device by said second color correction circuit of said at least one additional camera device through said second control circuit of said at least one additional camera device based on the data detected by said first correction data-detecting circuit of said first camera device.

* * * * *

UNITED STATES PATENT AND TRADEMARK OFFICE
CERTIFICATE OF CORRECTION

PATENT NO. : 5,179,437
DATED : January 12, 1993
INVENTOR(S) : Norihiko Kawada, et. al.

It is certified that error appears in the above-indentified patent and that said Letters Patent is hereby corrected as shown below:

Title page, item [73], Assignee: delete "Ikegani" and insert --Ikegami--.

Signed and Sealed this

Twenty-sixth Day of April, 1994

Attest:

BRUCE LEHMAN

*Attesting Officer*          *Commissioner of Patents and Trademarks*